(12) United States Patent
Urban et al.

(10) Patent No.: US 11,109,045 B2
(45) Date of Patent: Aug. 31, 2021

(54) METHOD AND DEVICE FOR ENCODING/DECODING AN IMAGE UNIT COMPRISING IMAGE DATA REPRESENTED BY A LUMINANCE CHANNEL AND AT LEAST ONE CHROMINANCE CHANNEL

(71) Applicant: INTERDIGITAL VC HOLDINGS, INC., Wilmington, DE (US)

(72) Inventors: Fabrice Urban, Thorigne Fouillard (FR); Franck Galpin, Thorigne-Fouillard (FR); Tangi Poirier, Rennes (FR); Fabrice Leleannec, Mouazé (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 280 days.

(21) Appl. No.: 16/076,170

(22) PCT Filed: Feb. 3, 2017

(86) PCT No.: PCT/EP2017/052316
§ 371 (c)(1),
(2) Date: Aug. 7, 2018

(87) PCT Pub. No.: WO2017/137311
PCT Pub. Date: Aug. 17, 2017

(65) Prior Publication Data
US 2021/0006805 A1 Jan. 7, 2021

(30) Foreign Application Priority Data
Feb. 11, 2016 (EP) .................................. 16305153

(51) Int. Cl.
*H04N 19/186* (2014.01)
*H04N 19/96* (2014.01)

(52) U.S. Cl.
CPC ........... *H04N 19/186* (2014.11); *H04N 19/96* (2014.11)

(58) Field of Classification Search
CPC .. H04N 19/176; H04N 19/186; H04N 19/119; H04N 19/96; H04N 19/60; G06T 9/007
See application file for complete search history.

(56) References Cited

U.S. PATENT DOCUMENTS

| 2012/0230421 A1 | 9/2012 | Chen et al. |
| 2013/0195199 A1 | 8/2013 | Guo et al. |

(Continued)

FOREIGN PATENT DOCUMENTS

| JP | 2013502150 A | 1/2013 |
| JP | 2014509160 A | 4/2014 |

(Continued)

OTHER PUBLICATIONS

Anonymous, "Infromation technology—Coding of audio-visual objects—Part 10: Advanced Video Coding", International Standard, ISO/IEC 14496-10, Oct. 1, 2004, pp. 1-280.

(Continued)

*Primary Examiner* — Obafemi O Sosanya
(74) *Attorney, Agent, or Firm* — Invention Mine LLC (57) ABSTRACT

The present principles relates to a method for encoding an image unit comprising image data represented by a luminance channel and at least one chrominance channel, the method comprising obtaining a luma coding-tree by splitting a luminance unit representative of the luminance channel of said image unit and obtaining a chroma coding-tree by splitting a chrominance unit representative of at least one chrominance channel of said image unit. The method is characterized in that obtaining said chroma coding-tree comprises: —determining whether said chroma coding-tree and said luma coding-tree are identical; and —signaling an (Continued)

information data indicating whether said chroma coding-tree and said luma coding-tree are identical.

24 Claims, 7 Drawing Sheets

(56) References Cited

U.S. PATENT DOCUMENTS

| | | | |
|---|---|---|---|
| 2015/0030067 A1 | 1/2015 | Zhao et al. | |
| 2015/0373332 A1* | 12/2015 | Kim | H04N 19/136 375/240.03 |
| 2019/0356915 A1* | 11/2019 | Jang | H04N 19/12 |

FOREIGN PATENT DOCUMENTS

| | | |
|---|---|---|
| RU | 2562764 C2 | 9/2015 |
| WO | WO2013067174 | 5/2013 |
| WO | 2013107027 A1 | 7/2013 |
| WO | WO2015169207 | 11/2015 |

OTHER PUBLICATIONS

Anonymous, "Reference software for ITU-T H.265 high efficiency video coding", International Telecommunication Union Standard, ITU-T H.265.2, Series H: Audiovisual and Multimedia Systems, Infrastructure of audiovisual services—Coding of moving video, Oct. 2014, pp. 1-12.

Anonymous, "Requirements for a Future Video Coding Standard", International Organisation for Standardisation, ISO/IEC JTC 1/SC 29/WG 11, Coding of Moving Pictures and Audio, Document N15340, Warsaw, Poland, Jun. 2015, pp. 1-12.

McCann et al., "High Efficiency Video Coding (HEVC) Encoder Description v 16 (HM16)", International Organisation for Standardisation, ISO/IEC JTC 1/SC 29/WG 11, Coding of Moving Pictures and Audio, Document N14703, Sapporo, Japan, Jul. 2014, pp. 1-59.

Anonymous, "Block partitioning structure for next generation video coding", MediaTek Inc., ITU Telecommunication Standardization Sector, Study Group 16—Contribution 966 R3, COM 16-C 966 R3—E, Sep. 2015, pp. 1-8.

Kim, J., "AHG5: Separate chroma transform depth for non 4:2:0 format", Journal Collaborative Team on Video Coding (JCT-VC) of ITU-T SG 16 WP3 and ISO/IEC JCT 1/SC 29/WG 11, Document JCTVC-M0098, 13th Meeting, Incheon, Korea, Apr. 18, 2013, pp. 1-4.

Urban, F. et. al., "Decoupled Luma/Chroma Transform Trees for Infra", Joint Video Exploration (JVET) of ITU-T SG 16 WP 3 and ISO/IEC JTC 1/SC 29/WG 11, 3rd Meeting, 2016, Doc: JVET-C0039 pp. 1-2.

* cited by examiner

| | Descriptor |
|---|---|
| transform_tree( x0, y0, xBase, yBase, log2TrafoSize, trafoDepth, blkIdx ) { | |
|   if( log2TrafoSize <= Log2MaxTrafoSize && | |
|     log2TrafoSize > Log2MinTrafoSize && | |
|     trafoDepth < MaxTrafoDepth && !( IntraSplitFlag && ( trafoDepth == 0 ) ) ) | |
|     split_transform_flag[ x0 ][ y0 ][ trafoDepth ] | ae(v) |
|   if( ( trafoDepth == 0 && split_transform_flag[ x0 ][ y0 ][ trafoDepth ]==0 ) { | |
|     independantChromaTuFlag | ae(v) |
|   } | |
|   if( log2TrafoSize > 2 && (independantChromaTuFlag == 0 || log2TrafoSize <= Log2MaxTrafoSize) ) { | |
|     if( trafoDepth == 0 || cbf_cb[ xBase ][ yBase ][ trafoDepth − 1 ] ) | |
|       cbf_cb[ x0 ][ y0 ][ trafoDepth ] | ae(v) |
|     if( trafoDepth == 0 || cbf_cr[ xBase ][ yBase ][ trafoDepth − 1 ] ) | |
|       cbf_cr[ x0 ][ y0 ][ trafoDepth ] | ae(v) |
|   } | |
|   if( split_transform_flag[ x0 ][ y0 ][ trafoDepth ] ) { | |
|     x1 = x0 + ( 1 << ( log2TrafoSize − 1 ) ) | |
|     y1 = y0 + ( 1 << ( log2TrafoSize − 1 ) ) | |
|     transform_tree( x0, y0, x0, y0, log2TrafoSize − 1, trafoDepth + 1, 0 ) | |
|     transform_tree( x1, y0, x0, y0, log2TrafoSize − 1, trafoDepth + 1, 1 ) | |
|     transform_tree( x0, y1, x0, y0, log2TrafoSize − 1, trafoDepth + 1, 2 ) | |
|     transform_tree( x1, y1, x0, y0, log2TrafoSize − 1, trafoDepth + 1, 3 ) | |
|   } else { | |
|     if( CuPredMode[ x0 ][ y0 ] == MODE_INTRA || trafoDepth != 0 || | |
|       cbf_cb[ x0 ][ y0 ][ trafoDepth ] || cbf_cr[ x0 ][ y0 ][ trafoDepth ] ) | |
|       cbf_luma[ x0 ][ y0 ][ trafoDepth ] | ae(v) |
|   } | |
|   if( split_transform_flag[ x0 ][ y0 ][ trafoDepth ] == 0|| | |
|     independantChromaTuFlag && log2TrafoSize <= Log2MaxTrafoSize ) { | |
|     transform_unit( x0, y0, xBase, yBase, log2TrafoSize, trafoDepth, blkIdx ) | |
|   } | |
| } | |

Fig. 4

| | Descriptor |
|---|---|
| transform_unit( x0, y0, xBase, yBase, log2TrafoSize, trafoDepth, blkIdx ) { | |
|   if( cbf_luma[ x0 ][ y0 ][ trafoDepth ] \|\| cbf_cb[ x0 ][ y0 ][ trafoDepth ] \|\| | |
|     cbf_cr[ x0 ][ y0 ][ trafoDepth ] ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|     if( cbf_luma[ x0 ][ y0 ][ trafoDepth ] && split_transform_flag[ x0 ][ y0 ][ trafoDepth ] == 0 ) | |
|       residual_coding( x0, y0, log2TrafoSize, 0 ) | |
|     if (independantChromaTuFlag == 0 \|\| | |
|       log2TrafoSize == Log2MaxTrafoSize \|\| trafoDepth == 0) { | |
|       if( log2TrafoSize > 2 ) { | |
|         if( cbf_cb[ x0 ][ y0 ][ trafoDepth ] ) | |
|           residual_coding( x0, y0, log2TrafoSize − 1, 1 ) | |
|         if( cbf_cr[ x0 ][ y0 ][ trafoDepth ] ) | |
|           residual_coding( x0, y0, log2TrafoSize − 1, 2 ) | |
|       } else if( blkIdx == 3 ) { | |
|         if( cbf_cb[ xBase ][ yBase ][ trafoDepth ] ) | |
|           residual_coding( xBase, yBase, log2TrafoSize, 1 ) | |
|         if( cbf_cr[ xBase ][ yBase ][ trafoDepth ] ) | |
|           residual_coding( xBase, yBase, log2TrafoSize, 2 ) | |

METHOD AND DEVICE FOR ENCODING/DECODING AN IMAGE UNIT COMPRISING IMAGE DATA REPRESENTED BY A LUMINANCE CHANNEL AND AT LEAST ONE CHROMINANCE CHANNEL

This application claims the benefit, under 35 U.S.C. § 365 of International Application PCT/EP2017/052316, filed Feb. 3, 2017, which was published in accordance with PCT Article 21(2) on Aug. 17, 2017, in English, and which claims the benefit of European Patent Application No. 16305153.5, filed Feb. 11, 2016.

1. FIELD

The present principles generally relate to image/video encoding and decoding.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, image data contains one or several arrays of samples (pixel data) in a specific image/video format which specifies all information relative to the pixel values of an image (or a video) and all information which may be used by a display and/or any other device to visualize and/or decode an image (or video) for example.

Image data comprises at least one component, in the shape of a first array of samples, usually a luma (or luminance) component, and, possibly, at least one other component, in the shape of at least one other array of samples, usually a color component. Or, equivalently, the same image data may also be represented by a set of arrays of color samples, such as the traditional tri-chromatic RGB representation.

Pixel data, relative to a pixel, is represented by a vector of C values, where C is the number of components. Each value of a vector is represented with a number of bits which defines a maximal dynamic range of the pixel values.

An image unit comprises image data that are represented by a luminance channel and at least one chrominance channel. Typically, image data may be represented in the well-known YCbCr, YUV, RGB color spaces but the present principles are not limited to a specific color space. Thus, an image unit comprises a luma unit that represents the luminance channel of the image unit and at least one chroma unit that represents the chrominance channel of the image unit.

A non-limitative example of an image unit is a Coding Unit or a Transform unit as defined in HEVC or a block or macroblock as defined in most of MPEG standards. An image unit may be any square or rectangular part of an image.

In some video compression standards like H.265/HEVC (High Efficiency Video Coding (HEVC), Recommendation ITU-T H.265|International Standard ISO/IEC 23008-2, October 2014), the image of a sequence of image (video) is divided into so-called Coding-tree Units (CTU), which size is typically 64×64, 128×128, or 256×256 pixels.

Figure 1:
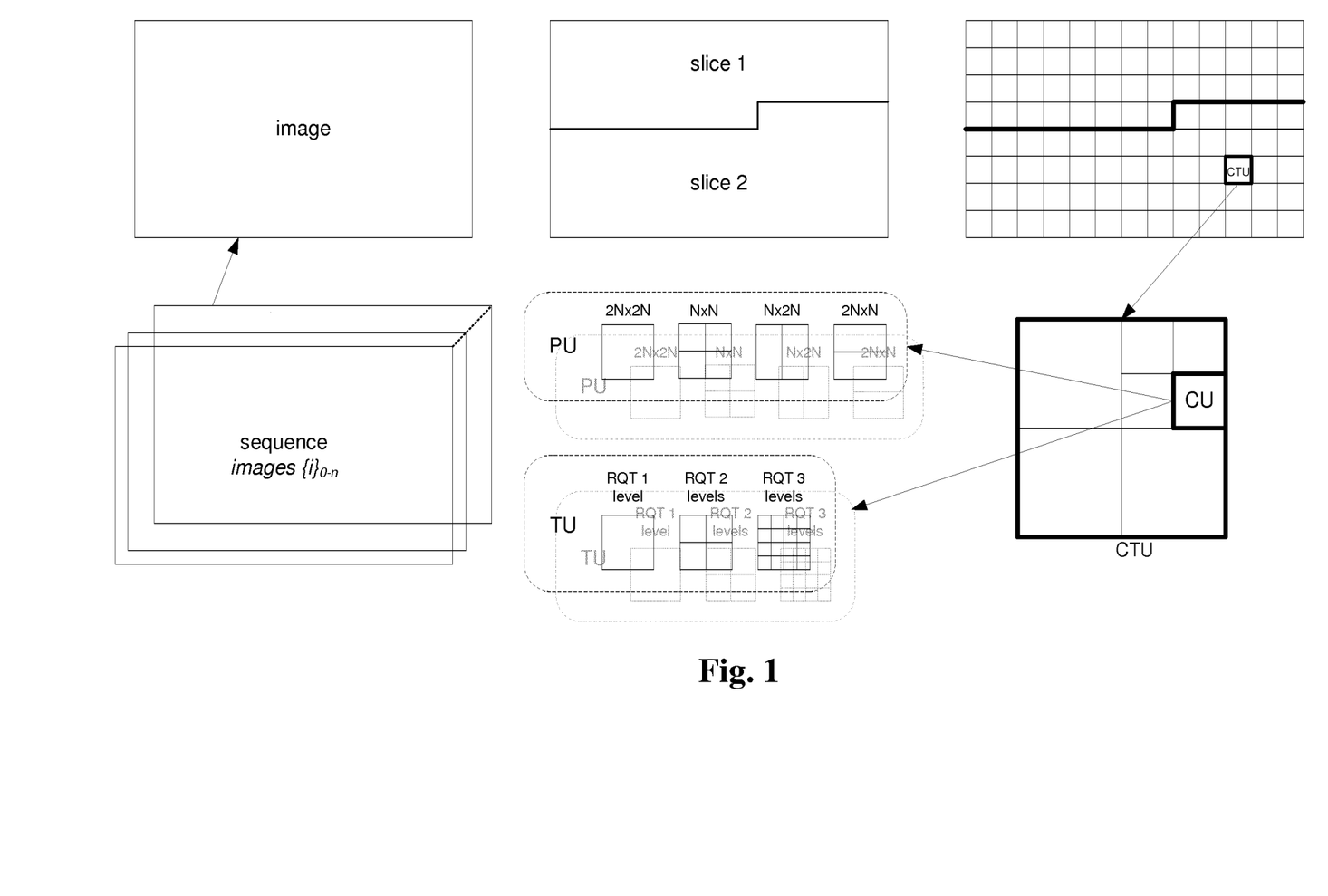
FIG. 1 illustrates an overall video structure of the prediction and transform partitioning.

Each CTU is represented by a Coding-tree in the compressed domain as shown in FIG. 1. As illustrated, this may be a quad-tree partitioning (division, splitting) of the CTU, where each leaf is called a Coding Unit (CU). A Coding Unit (CU) contains the main information for coding an image unit and may be further split into Prediction Units (PU) and Transform Units (TU). The Prediction Unit (PU) contains the information for predicting the pixel values inside an image unit and the Transform Unit (TU) represents the pixels of an image unit on which the transform is applied and thus the remaining of the encoding process.

In HEVC standard, two geometries then coexist: prediction partitioning and transform partitioning and two main cases happen in intra prediction:
  1) A current Transform Unit (TU) and the Prediction Unit (PU) are of same size;
  2) The Prediction Unit PU is composed of 4 Transform Unit TUs, each Transform Unit TU can be split.

In the second case, the Luma and Chroma channels (in case of YUV video) follow the same partitioning (quad-tree) (except for small blocks in 4:2:0 or 4:2:2 sampling where the chroma TUs cannot be split).

The prediction relies on previously decoded pixels from the same or other image, then the residual is transformed following a Transform Unit TU quad-tree. The PU may contain several smaller TUs that can be further split into smaller TUs in a quad-tree fashion. In this case, chroma TUs follow the Luma TU quad-tree. For small blocks, when not in 4:4:4 sampling, the chroma TUs cannot be split.

Figure 2:
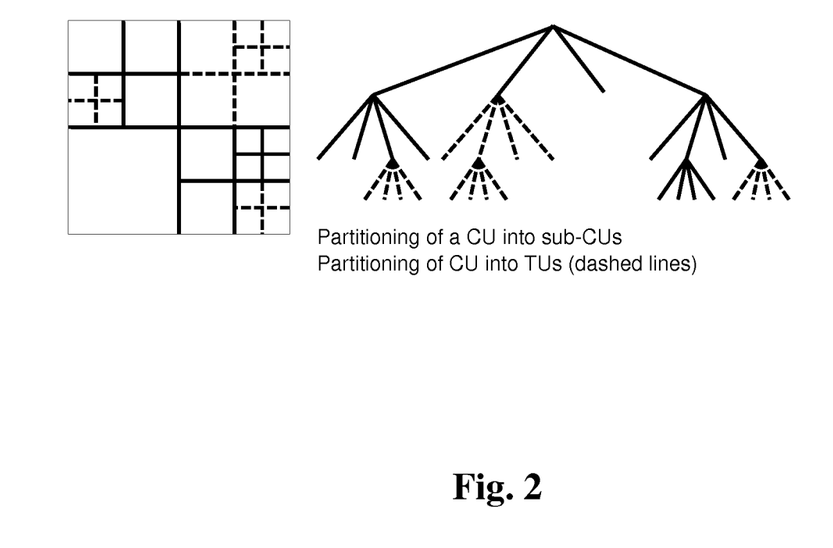
FIG. 2 shows an example of a segmentation into TUs using a quad-tree.

FIG. 2 shows an example of a segmentation into TUs using a quad-tree (Residual Quad-Tree (RQT).) The partitioning into TUs is signaled and maximum and minimum transform sizes are signaled in slice header. For quad-tree nodes between these bounds, subdivision flags are coded. The same RQT is used for both luma and chroma components of each CU.

In H.265/HEVC, only one RQT is transmitted for both luma and chroma components of each CU. When the TU coding-tree is deep, this generates signaling cost for chroma units that could advantageously be replaced by coded coefficient.

On the opposite, separating the partitioning of the chroma and Luma component has been proposed in MediaTek Inc, "Block partitioning structure for next generation video coding", ITU-T SG16, COM 16-C 966 R3-E, Geneva, October 2015), where for each image unit, two distinct coding-trees are defined: One for Luma and one for Chroma. A coding-tree may be a quad-tree, a binary-tree or a triple-tree used for coding an image unit according to non-limitative examples.

This solution results in fully separate Luma and Chroma coding-trees, respectively obtained by splitting a luma unit and a chroma unit relative to an image unit, but results in additional signaling cost.

The problem solved by the present principles is to improve the coding efficiency of an image unit when separate coding-trees are used for coding the luma and chroma units relative to said image unit.

More generally, the problem to-be solved is how to efficiently compress an image unit comprising image data represented by multiple channels.

3. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for encoding an image unit comprising image data represented by a luminance channel and at least one chrominance channel. The method comprises obtaining a luma coding-tree by splitting a luminance unit representative of the luminance channel of said image unit and obtaining a chroma coding-tree by splitting a chrominance unit representative of at least one chrominance channel of said image unit. According to the present principles, obtaining said chroma coding-tree comprises:

> determining whether said chroma coding-tree and said luma coding-tree are identical; and
>
> signaling an information data indicating whether said chroma coding-tree and said luma coding-tree are identical.

According to another of their aspects, the present principles relate to a method for decoding an image unit comprising image data represented by a luminance channel and at least one chrominance channel. The method comprises obtaining a luma coding-tree by splitting a luminance unit representative of the luminance channel of said image unit and obtaining a chroma coding-tree by splitting a chrominance unit representative of at least one chrominance channel of said image unit. According to the present principles, obtaining said chroma coding-tree comprises:

> determining whether said chroma coding-tree and said luma coding-tree are identical; and
>
> signaling an information data indicating whether said chroma coding-tree and said luma coding-tree are identical.

According to other of their aspects, the present principles relate to a device comprising a processor configured to implement the above methods, a signal having syntax element related to an image unit comprising picture data, a computer program product comprising program code instructions to execute the steps of the above method when this program is executed on a computer, and a non-transitory storage medium carrying instructions of program code for executing steps of the above method when said program is executed on a computing device.

The specific nature of the present principles as well as other objects, advantages, features and uses of the present principles will become evident from the following description of examples taken in conjunction with the accompanying drawings.

4. BRIEF DESCRIPTION OF DRAWINGS

In the drawings, examples of the present principles are illustrated. It shows:

FIG. 4 shows an example of the syntax of the transform tree in accordance with an example of present principles;

Similar or same elements are referenced with the same reference numbers.

6. DESCRIPTION OF EXAMPLE OF THE PRESENT PRINCIPLES

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding an image unit of an image but extends to the encoding/decoding image units of a sequence of images (video) because each image unit of each image of the sequence is sequentially encoded/decoded as described below.

The present principles relate to a method for encoding an image unit comprising image data represented by a luminance channel and at least one chrominance channel.

The method obtains a luma coding-tree LUMAQ by splitting a luminance unit representative of the luminance channel of said image unit and obtains a chroma coding-tree CHROQ by splitting a chrominance unit representative of at least one chrominance channel of said image unit.

Obtaining said chroma coding-tree CHROQ comprises determining whether said chroma coding-tree CHROQ and said luma coding-tree LUMAQ are identical, and signaling, in a signal S, an information data INFO indicating whether said chroma coding-tree CHROQ and said luma coding-tree LUMAQ are identical.

This improves the coding efficiency compared to the prior art because additional syntax used to encode the chroma and luma coding-trees is limited compared to a separate coding of these two coding-trees.

According to an embodiment, the information data INFO is a flag equal to a first value when the chroma coding-tree CHROQ and the luma coding-tree LUMAQ are identical and to a second value otherwise.

According to an embodiment, when the information data INFO equals to said second value, the information data INFO further indicates that the chrominance unit is not split.

Figure 3:
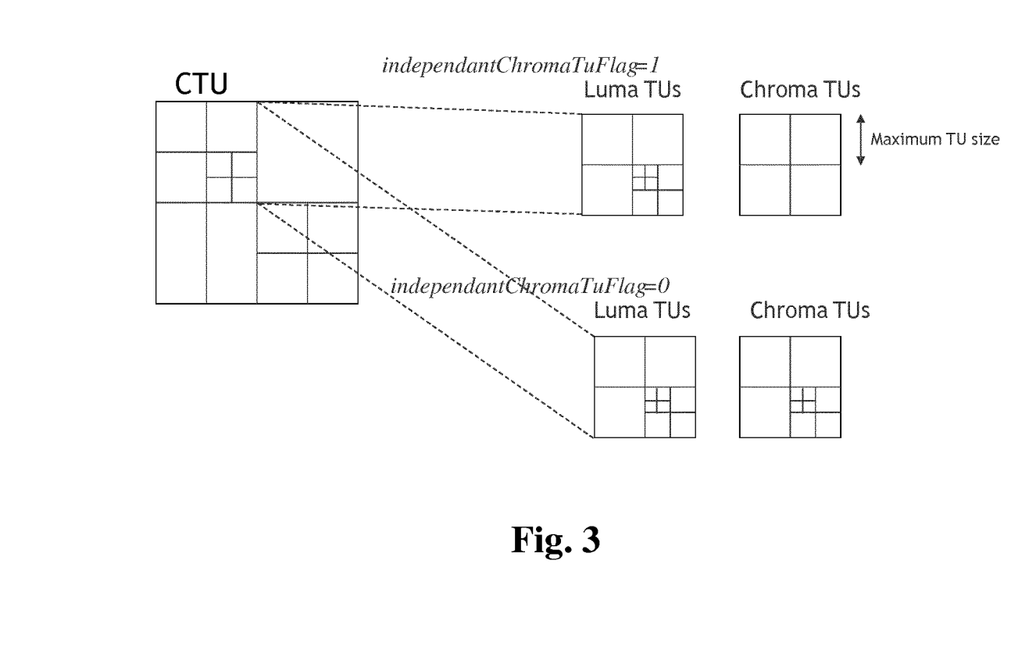
FIG. 3 shows an example of Luma and Chroma coding-tree splitting depending on independantChromaTuFlag syntax element in accordance with an example of present principles.

FIG. 3 shows an example of Luma and Chroma coding-trees when the image unit is a residual transform Unit (TU) as defined in HEVC and the information data INFO is a flag denoted independantChromaTuFlag.

When independantChromaTuFlag=0, the luma and chroma coding-trees are identical (bottom part in FIG. 3) and, when independantChromaTuFlag=1, the luma and chroma coding-trees are not identical (top part in FIG. 3).

According to a variant, the flag independantChromaTuFlag is coded as an additional syntax element contained in the "transform tree" syntax element of the HEVC specification as shown in FIG. 4. (HEVC, section 7.3.8.8 Transform tree syntax).

Figure 5:
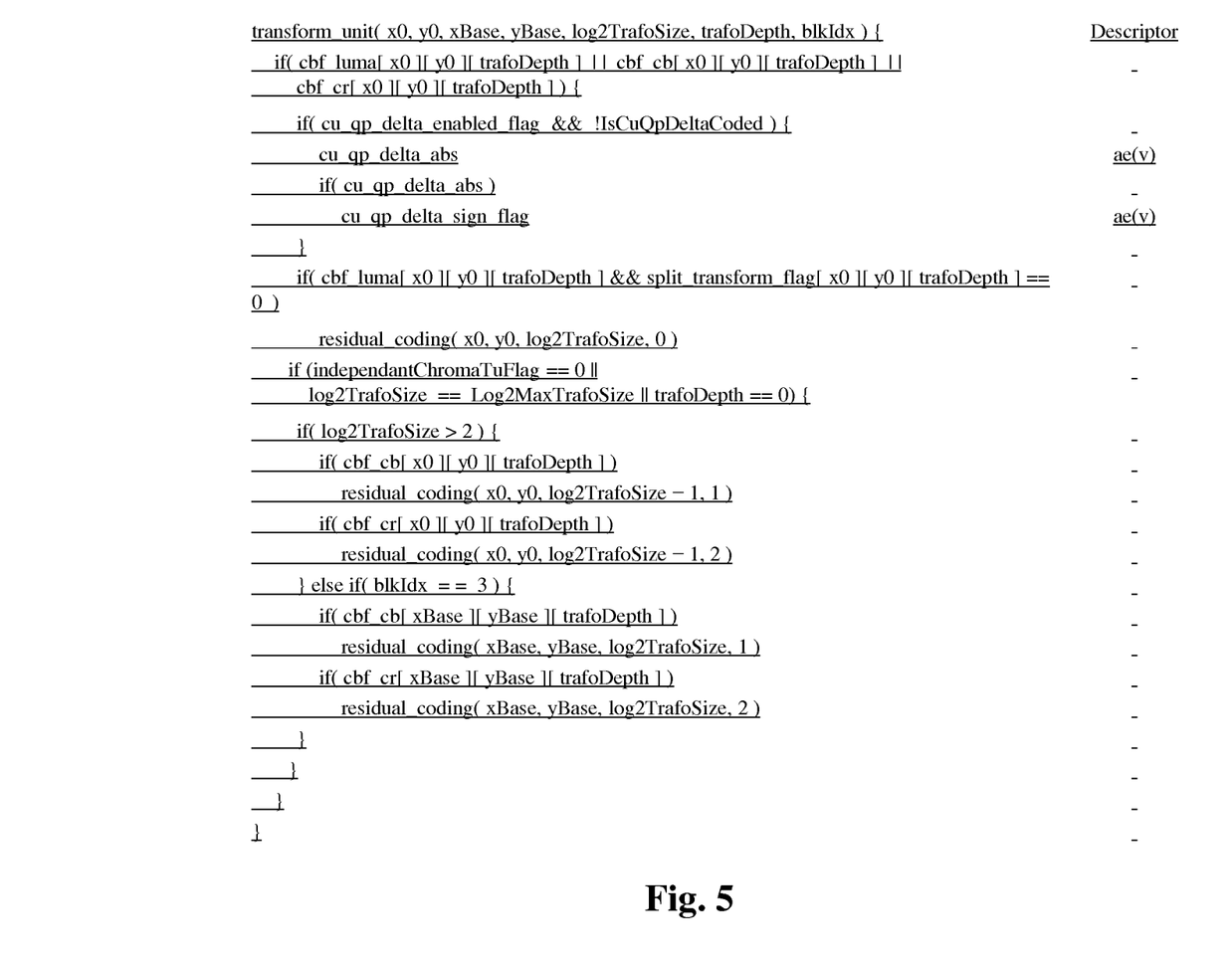
FIG. 5 shows an example of syntax of a transform unit in accordance with an example of present principles.

FIG. 5 shows an example of syntax of a transform unit.

According to an embodiment, illustrated in FIG. 3, when said chroma and luma coding-trees are determined as being not identical, if the size of at least one leaf L of said chroma coding-tree CHROQ is larger than a maximum size MS (for example MS equals to the size of the image unit to be encoded), then said at least one leaf L is recursively split until the sizes of the leaves of said chroma coding-tree CHROQ reach said maximum size MS.

In FIG. 3, the leaves of the chroma coding-tree CHROQ (top in FIG. 3) are not split because the size of the current leaves equals to a maximum size of the TU size (MS).

The result is that the size of the leaves of the chroma coding-tree CHROQ are as big as possible (in the limit of the given maximum size MS).

A splitting strategy can be to optimally decide by rate/distortion optimization whether to keep the size of the current leaves of the chroma coding-tree CHROQ as big as possible or to split them. As an example, for each image unit to be encoded, the coding is done for independantChromaTuFlag=0 and for independantChromaTuFlag=1, i.e. splitting or not the chrominance channel according to the luma coding-tree LUMAQ, the distortion and the bit-rate are computed for both situations and the best rate/distortion compromise is kept i.e the flag value leading to the lowest rate/distorsion J=D+lambda*rateCost, where D is a L2 norm between the source (original image unit) and reconstructed block (decoded image unit), rateCost the bit count of the coded piece of bitstream, and lambda a coding parameter. This technique is well known and used in the Joint Model of the MPEG/ITU H.264/AVC, in the reference software of H.265/HEVC, and in the Joint Exploration Model encoding methods "High Efficiency Video Coding (HEVC) Test Model 16 (HM 16) Encoder Description, JCTVC-R1002, Sapporo, Japan, 30 Jun.-7 Jul. 2014".

According to an embodiment, the chroma and luma coding-trees are identical until a given decomposition level and stops the splitting of the leaves of the chroma coding-tree CHROQ for higher decomposition levels.

According to an embodiment, the information data INFO is signalled for at least one decomposition level of the chroma coding-tree CHROQ when said at least one decomposition level is split, said information data INFO indicates whether said at least one decomposition level of the chroma coding-tree follows the splitting of the same level of the luma coding-tree.

According to a variant, said information data INFO further indicates when stopping the splitting of a leaf of the Chroma coding-tree CHROQ.

Figure 6:
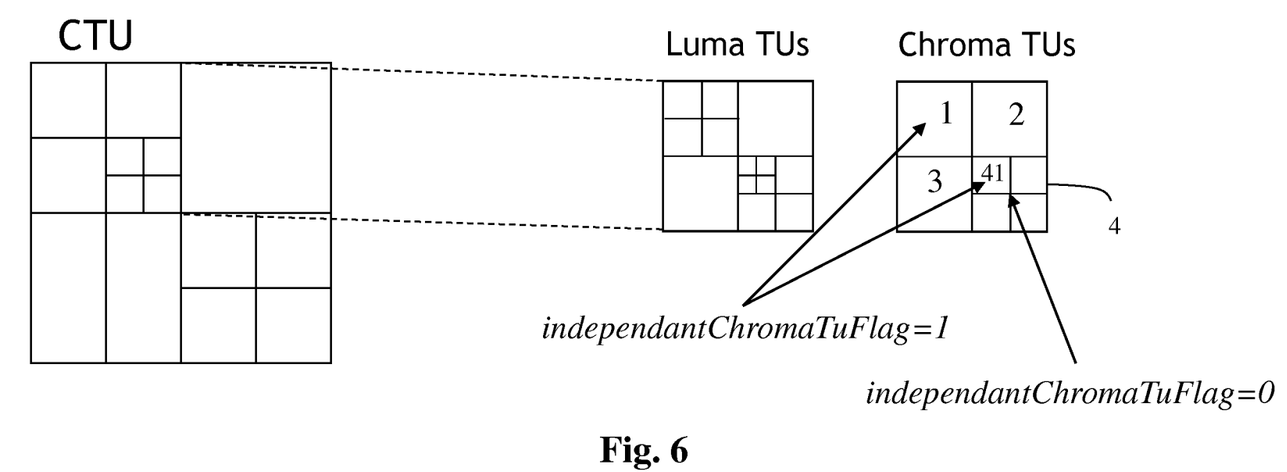
FIG. 6 shows another example of Luma and Chroma coding-tree splitting depending on independantChromaTuFlag syntax element in accordance with an example of present principles.

FIG. 6 shows an example of separate CU coding-tree per channel type or per component in accordance with an example of present principles.

Here, for example, an optimal luma and chroma coding-tree are obtained when the image unit is a residual transform Unit (TU) as defined in HEVC and the information data INFO is a flag denoted independantChromaTuFlag.

Following said optimal splitting, at a first decomposition level of a CU of the CTU, the chrominance unit, relative to said CU, is split into 4 sub-units 1-4. At a second decomposition level, the chroma sub-units 1-3 are not further split and the independantChromaTuFlag=1 is signalled for said chroma sub-unit 1. No independantChromaTuFlag is transmitted for sub-units 2 and 3 (because corresponding Luma sub-units are not split). The chroma sub-unit 4 is further split into 4 other sub-units 41-44 and the independantChromaTuFlag=0 is signalled for said sub-unit 4. Finally, the sub-units 41-44 are not further split and the independantChromaTu- Flag=1 is signalled for said chroma sub-unit 41 (No independantChromaTuFlag transmitted for sub-units 2-4).

This leads to more syntax to be transmitted than the above embodiment but allows determining the optimal size for the leaves of the chroma coding-tree, between the maximum size MS and the size of the leaves of the luma coding-tree LUMAQ at the same decomposition level.

Note that each of the embodiments and variants can be performed on a per-chroma-channel basis. i.e. a chroma coding-tree is computed for each chrominance channel. The information data INFO is then signaled for each chrominance channel.

The present principles further relate to a method for encoding an image, said image comprising at least one image unit encoded according to an encoding method as above described in accordance with the present principles.

The present principles further relate to a method for decoding an image unit comprising image data represented by a luminance channel and at least one chrominance channel. The method obtains a luma coding-tree by splitting a luminance unit representative of the luminance channel of said image unit and obtains a chroma coding-tree by splitting a chrominance unit representative of at least one chrominance channel of said image unit.

Obtaining said chroma coding-tree comprises determining whether said chroma coding-tree and said luma coding-tree are identical. The method further signals an information data indicating whether said chroma coding-tree and said luma coding-tree are identical.

Various embodiments and variants of the decoding method may be easily deduced from the above description of the encoding method, in particular from the description of FIG. 1-6.

For example, the decoding method comprises obtaining, from a signal or a memory, an information data INFO indicating whether a chroma coding-tree CHROQ and a luma coding-tree LUMQ are identical. Said information data INFO may be a flag equals to a first value when the chroma coding-tree and the luma coding-tree are identical and to a second value otherwise. Said information data INFO, when equals to said second value (i.e. when the chroma coding-tree and the luma coding-tree are not identical), may also indicate that the chrominance unit is not split.

The present principles further relate to a method for decoding an image, said image comprising at least one image unit encoded according to an encoding method as above described in accordance with the present principles.

On FIG. 1-6, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 7:
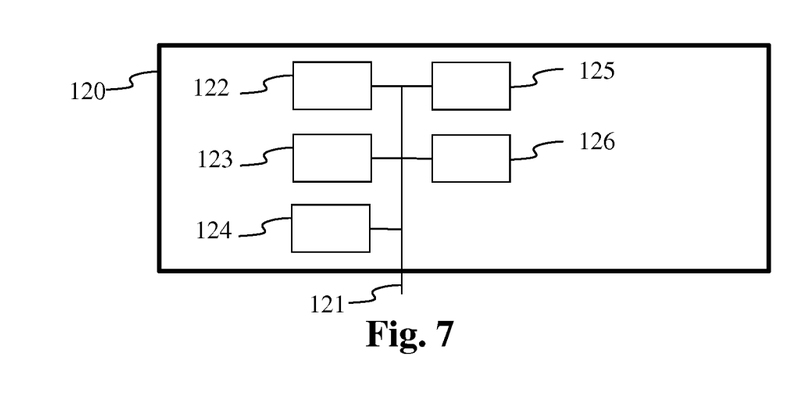
FIG. 7 shows an example of an architecture of a device in accordance with an example of present principles.

FIG. 7 represents an exemplary architecture of a device 120 which may be configured to implement a method described in relation with FIGS. 1-6.

Device 120 comprises following elements that are linked together by a data and address bus 121:

- a microprocessor 122 (or CPU), which is, for example, a DSP (or Digital Signal Processor);
- a ROM (or Read Only Memory) 123;
- a RAM (or Random Access Memory) 124;
- an I/O interface 125 for reception of data to transmit, from an application; and
- a battery 126.

In accordance with an example, the battery 126 is external to the device. In each of mentioned memory, the word «register» used in the specification can correspond to area of small capacity (some bits) or to very large area (e.g. a whole program or large amount of received or decoded data). The ROM 123 comprises at least a program and parameters. The ROM 123 may store algorithms and instructions to perform techniques in accordance with present principles. When switched on, the CPU 122 uploads the program in the RAM and executes the corresponding instructions.

RAM 124 comprises, in a register, the program executed by the CPU 122 and uploaded after switch on of the device 120, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the image comprising an image unit or the image unit to be encoded is obtained from a source. For example, the source belongs to a set comprising:

- a local memory (123 or 124), e.g. a video memory or a RAM (or Random Access Memory), a flash memory, a ROM (or Read Only Memory), a hard disk;
- a storage interface (125), e.g. an interface with a mass storage, a RAM, a flash memory, a ROM, an optical disc or a magnetic support;
- a communication interface (125), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded image unit or the decoded image comprising a decoded image unit is sent to a destination; specifically, the destination belongs to a set comprising:

- a local memory (123 or 124), e.g. a video memory or a RAM, a flash memory, a hard disk;
- a storage interface (125), e.g. an interface with a mass storage, a RAM, a flash memory, a ROM, an optical disc or a magnetic support;

a communication interface (125), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and a display.

In accordance with examples of encoding or encoder, a signal S is generated.

The signal S has syntax element related to an image unit comprising picture data represented by a luminance channel and at least one chrominance channel. Said syntax element defines a luma coding-tree obtained by splitting a luminance unit representative of the luminance channel of said image unit and a chroma coding-tree obtained by splitting a chrominance unit representative of at least one chrominance channel of said image unit. The Signal is formatted to comprise an information data INFO indicating whether said chroma coding-tree and said luma coding-tree are identical, and said information data INFO further indicates that the chrominance unit is not split when said chroma and luma coding-trees are not identical.

According to a variant, said information data further indicates whether or not said at least one decomposition level of the chroma coding-tree follows the splitting of the same level of the luma coding-tree.

The signal S is sent to a destination. As an example, the signal S is stored in a local or remote memory, e.g. a video memory (124) or a RAM (124), a hard disk (123). In a variant, the signal S is sent to a storage interface (125), e.g. an interface with a mass storage, a flash memory, ROM, an optical disc or a magnetic support and/or transmitted over a communication interface (125), e.g. an interface to a point to point link, a communication bus, a point to multipoint link or a broadcast network.

In accordance with examples of decoding or decoder, the signal S is obtained from a source. Exemplarily, the signal S is read from a local memory, e.g. a video memory (124), a RAM (124), a ROM (123), a flash memory (123) or a hard disk (123). In a variant, the bitstream is received from a storage interface (125), e.g. an interface with a mass storage, a RAM, a ROM, a flash memory, an optical disc or a magnetic support and/or received from a communication interface (125), e.g. an interface to a point to point link, a bus, a point to multipoint link or a broadcast network.

In accordance with examples, device 120 being configured to implement an encoding method described in relation with FIG. 1-6, belongs to a set comprising:

a mobile device;
a communication device;
a game device;
a tablet (or tablet computer);
a laptop;
a still image camera;
a video camera;
an encoding chip;
a still image server; and
a video server (e.g. a broadcast server, a video-on-demand server or a web server).

In accordance with examples, device 120 being configured to implement a decoding method described above, belongs to a set comprising:

a mobile device;
a communication device;
a game device;
a set top box;
a TV set;
a tablet (or tablet computer);
a laptop;
a display and
a decoding chip.

Figure 8:
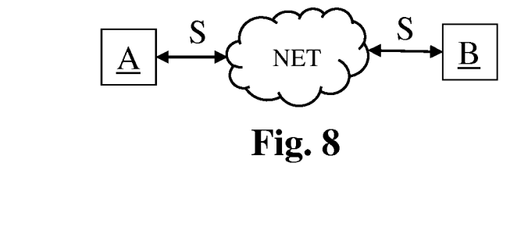
FIG. 8 shows two remote devices communicating over a communication network in accordance with an example of present principles.

According to an example of the present principles, illustrated in FIG. 8, in a transmission context between two remote devices A and B over a communication network NET, the device A comprises a processor in relation with memory RAM and ROM which are configured to implement a method for encoding image comprising at least one image unit or an image unit as described above and the device B comprises a processor in relation with memory RAM and ROM which are configured to implement a method for decoding as described above.

In accordance with an example, the network is a broadcast network, adapted to broadcast still images or video images from device A to decoding devices including the device B.

The signal S is intended to be transmitted by the device A and received by the device B.

Figure 9:
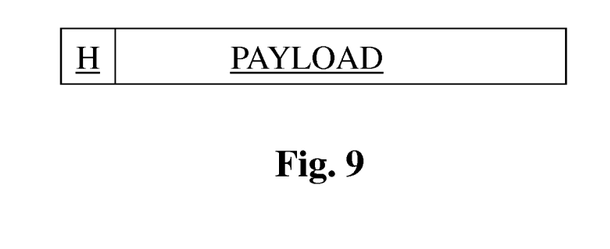
FIG. 9 shows the syntax of a signal in accordance with an example of present principles.

FIG. 9 shows an example of the syntax of such a signal when the data are transmitted over a packet-based transmission protocol. Each transmitted packet P comprises a header H and a payload PAYLOAD. A bit of the header H, for example, is dedicated to represent the information data carried by the signal S. In variant, multiple flags may be used to represent the information data INFO as above described and carried by the signal S.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing an image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising obtaining a luma coding-tree by splitting a luminance unit representative of a luminance channel of an image unit and obtaining a chroma coding-tree by splitting a chrominance unit representative of at least one chrominance channel of the image unit, wherein obtaining the chroma coding-tree comprises:
   signaling an information data indicating that a sub-unit of the chroma coding-tree at a given decomposition level is not split when the sub-unit of the chroma coding tree is not split, and a sub-unit of the luma coding tree is split; and
skipping the signaling of the information data indicating that the sub-unit of the chroma coding-tree is not split when the sub-unit of the chroma coding-tree is not split and that the sub-unit of the luma coding-tree co-located with the sub-unit of the chroma coding tree is not split.

2. A method comprising obtaining a luma coding-tree by splitting a luminance unit representative of a luminance channel of an image unit and obtaining a chroma coding-tree by splitting a chrominance unit representative of at least one chrominance channel of the image unit, wherein obtaining the chroma coding-tree comprises:
   parsing an information data indicating that a sub-unit of the chroma coding-tree at a given decomposition level is not split when the sub-unit of the chroma coding tree is not split and that a sub-unit of the luma coding tree is split; and
skipping the parsing of the information data indicating that the sub-unit of the chroma coding-tree is not split when the sub-unit of the chroma coding-tree is not split and that the sub-unit of the luma coding-tree co-located with the sub-unit of the chroma coding tree is not split.

3. A device comprising at least one processor and at least one memory having stored instructions operative, when executed by the at least one processor, to cause the device to:
   obtain a luma coding-tree by splitting a luminance unit representative of a luminance channel of an image unit; and
   obtain a chroma coding-tree by splitting a chrominance unit representative of at least one chrominance channel of the image unit, wherein obtaining the chroma coding-tree comprises:
   signaling an information data indicating that a sub-unit of the chroma coding-tree at a given decomposition level is not split when the sub-unit of the chroma coding tree is not split and that a sub-unit of the luma coding tree is split; and
skipping the signaling of the information data indicating that the sub-unit of the chroma coding-tree is not split when the sub-unit of the chroma coding-tree is not split and that the sub-unit of the luma coding-tree co-located with the sub-unit of the chroma coding tree is not split.

4. A device comprising at least one processor and at least one memory having stored instructions operative, when executed by the at least one processor, to cause the device to:
   obtain a luma coding-tree by splitting a luminance unit representative of a luminance channel of an image unit; and
   obtain a chroma coding-tree by splitting a chrominance unit representative of at least one chrominance channel of image unit, wherein obtaining chroma coding-tree comprises:
   parsing an information data indicating that a sub-unit of the chroma coding-tree at a given decomposition level is not split when the sub-unit of the chroma coding tree is not split and that a sub-unit of the luma coding tree is split; and
skipping the parsing of the information data indicating that the sub-unit of the chroma coding-tree is not split when the sub-unit of the chroma coding-tree is not split and that the sub-unit of the luma coding-tree co-located with the sub-unit of the chroma coding tree is not split.

5. The method of claim 1, wherein the information data is a flag equal to a first value when the chroma coding-tree and the luma coding-tree are identical and equal to a second value otherwise.

6. The method of claim 1, wherein, when the chroma coding-tree and the luma coding-tree are determined as being not identical:
   when the size of at least one leaf of the chroma coding-tree is larger than a maximum size, the at least one leaf is recursively split until the sizes of the leaves of the chroma coding-tree reach the maximum size.

7. The method of claim 1, wherein the chroma coding-tree and the luma coding-tree are identical until a given decomposition level and splitting of leaves of the chroma coding-tree for higher decomposition levels stops.

8. The method of claim 1, wherein the information data is signaled for at least one decomposition level of the chroma coding-tree when the at least one decomposition level is split, the information data indicating whether the at least one decomposition level of the chroma coding-tree follows the splitting of the same level of the luma coding-tree.

9. A method for encoding an image comprising at least one image unit, wherein the at least one image unit is coded according to the method of claim 1.

10. A method for decoding an image comprising at least one image unit, wherein the at least one image unit is decoded according to the method of claim 2.

11. A computer-readable storage medium having stored instructions that, when executed by a processor, cause the processor to obtain a luma coding-tree by splitting a luminance unit representative of a luminance channel of an image unit and obtaining a chroma coding-tree by splitting a chrominance unit representative of at least one chrominance channel of the image unit, wherein obtaining the chroma coding-tree comprises:
signaling an information data indicating that a sub-unit of the chroma coding-tree at a given decomposition level is not split when the sub-unit of the chroma coding tree is not split, and a sub-unit of the luma coding tree is split; and
skipping the signaling of the information data indicating that the sub-unit of the chroma coding-tree is not split when the sub-unit of the chroma coding-tree is not split and that the sub-unit of the luma coding-tree co-located with the sub-unit of the chroma coding tree is not split.

12. A non-transitory computer-readable storage medium having stored instructions that, when executed by a processor, cause the processor to obtain a luma coding-tree by splitting a luminance unit representative of a luminance channel of an image unit and obtaining a chroma coding-tree by splitting a chrominance unit representative of at least one chrominance channel of the image unit, wherein obtaining the chroma coding-tree comprises:
parsing an information data indicating that a sub-unit of the chroma coding-tree at a given decomposition level is not split when the sub-unit of the chroma coding tree is not split and that a sub-unit of the luma coding tree is split; and
skipping the parsing of the information data indicating that the sub-unit of the chroma coding-tree is not split when the sub-unit of the chroma coding-tree is not split and that the sub-unit of the luma coding-tree co-located with the sub-unit of the chroma coding tree is not split.

13. The method of claim 2, wherein the information data is a flag equal to a first value when the chroma coding-tree and the luma coding-tree are identical and equal to a second value otherwise.

14. The method of claim 2, wherein, when the chroma coding-tree and the luma coding-tree are determined as being not identical:
when the size of at least one leaf of the chroma coding-tree is larger than a maximum size, the at least one leaf is recursively split until the sizes of the leaves of the chroma coding-tree reach the maximum size.

15. The method of claim 2, wherein the chroma coding-tree and the luma coding-tree are identical until a given decomposition level and of leaves of the chroma coding-tree for higher decomposition levels stows.

16. The method of claim 2, wherein the information data is parsed for at least one decomposition level of the chroma coding-tree when the at least one decomposition level is split, the information data indicating whether the at least one decomposition level of the chroma coding-tree follows the splitting of the same level of the luma coding-tree.

17. The device of claim 3, wherein the information data is a flag equal to a first value when the chroma coding-tree and the luma coding-tree are identical and equal to a second value otherwise.

18. The device of claim 3, wherein, when the chroma coding-tree and the luma coding-tree are determined as being not identical:
when the size of at least one leaf of the chroma coding-tree is larger than a maximum size, the at least one leaf is recursively split until the sizes of the leaves of the chroma coding-tree reach the maximum size.

19. The device of claim 3, wherein the chroma coding-tree and the luma coding-tree are identical until a given decomposition level and splitting of leaves of the chroma coding-tree for higher decomposition levels stops.

20. The device of claim 3, wherein the information data is signaled for at least one decomposition level of the chroma coding-tree when the at least one decomposition level is split, the information data indicating whether the at least one decomposition level of the chroma coding-tree follows the splitting of the same level of the luma coding-tree.

21. The device of claim 4, wherein the information data is a flag equal to a first value when the chroma coding-tree and the luma coding-tree are identical and equal to a second value otherwise.

22. The device of claim 4, wherein, when the chroma coding-tree and the luma coding-tree are determined as being not identical:
when the size of at least one leaf of the chroma coding-tree is larger than a maximum size, the at least one leaf is recursively split until the sizes of the leaves of the chroma coding-tree reach the maximum size.

23. The device of claim 4, wherein the chroma coding-tree and the luma coding-tree are identical until a given decomposition level and splitting of leaves of the chroma coding-tree for higher decomposition levels stops.

24. The device of claim 4, wherein the information data is parsed for at least one decomposition level of the chroma coding-tree when the at least one decomposition level is split, the information data indicating whether the at least one decomposition level of the chroma coding-tree follows the splitting of the same level of the luma coding-tree.

* * * * *

UNITED STATES PATENT AND TRADEMARK OFFICE
CERTIFICATE OF CORRECTION

| | |
|---|---|
| PATENT NO. | : 11,109,045 B2 |
| APPLICATION NO. | : 16/076170 |
| DATED | : August 31, 2021 |
| INVENTOR(S) | : Fabrice Urban et al. |

It is certified that error appears in the above-identified patent and that said Letters Patent is hereby corrected as shown below:

On the Title Page

Item (56) OTHER PUBLICATIONS, Line 1: replace "Infromation" with --Information--.

In the Specification

Column 7, Line 34: replace "FIG" with --FIGs--.
Column 7, Line 49: replace "FIG" with --FIGs--.
Column 9, Line 49: replace "FIG" with --FIGs--.
Column 10, Line 4: replace "display" with --display;--.

In the Claims

Claim 15, Column 14, Line 5: after "and" insert --splitting--.
Claim 15, Column 14, Line 6: replace "stows" with --stops--.

Signed and Sealed this
Second Day of August, 2022

Katherine Kelly Vidal
*Director of the United States Patent and Trademark Office*